Feb. 26, 1957 R. SCOTT 2,783,311

MAGNETIC RECORDING HEAD MOUNTING APPARATUS

Filed Aug. 31, 1953

INVENTOR.
Raymond Scott
BY
R. Stephen Baker
ATTORNEY

United States Patent Office 2,783,311

Patented Feb. 26, 1957

2,783,311

MAGNETIC RECORDING HEAD MOUNTING APPARATUS

Raymond Scott, Babylon, N. Y.

Application August 31, 1953, Serial No. 377,605

5 Claims. (Cl. 179—100.2)

This invention relates to magnetic tape recorder mechanism and more particularly to a magnetic tape recording or reproducing head.

The art of magnetic tape recording has developed to an extent where a large number of channels or tracks can be applied to magnetic tape. The tracks are parallel to each other and are normally adapted for carrying independent signals. Recording or reproduction of such signals is generally accomplished by supporting the tape in direct contact with the recording head. The recording head is formed with a plurality of spaced gaps which apply the signals to the tape in parallel tracks. Of course, it will be recognized that the tapes are of such a width as to permit the application of such spaced, parallel tracks thereon.

A particular defect in the operation of such multi-channel recording operations is the tendency toward lateral shifting or buckling of the tape on the recording head which supports it. This is particularly true because of the great width of multi-track tape relative to its thickness. The tape being so wide and thin has very little sturdiness and is so limp and weak that it is easily subject to physical distortion thereby causing disadvantages such as amplitude deviations and track shifting. Old or much used tape is even more subject to such action.

With the foregoing in mind, I have devised a magnetic recording head for multi-channel operation which is mounted so as to substantially eliminate the adverse effects of any lateral shift or displacement of the tape. This is effected by mechanism which causes the head to rock in response to any deviation of the running tape from a normal course so as to eliminate any relative lateral motion between the recording head and the tape. Obviously, therefore, this serves to correct the above mentioned defect since it is only relative movement between the tape and the head which causes such defect. The recording head is, pursuant to my invention, mounted on a rocking or floating pivot so as to respond to and compensate for lateral deviations of the tape. At the same time, I have recognized that different tape speeds or different types of tapes may bring about varying degrees of possible deviation and I have accordingly provided adjustable damping means for regulating the rocking sensitivity of the recording head.

The invention will further be understood from the following description and drawings in which.

Figures 1, 2, 3, 4:
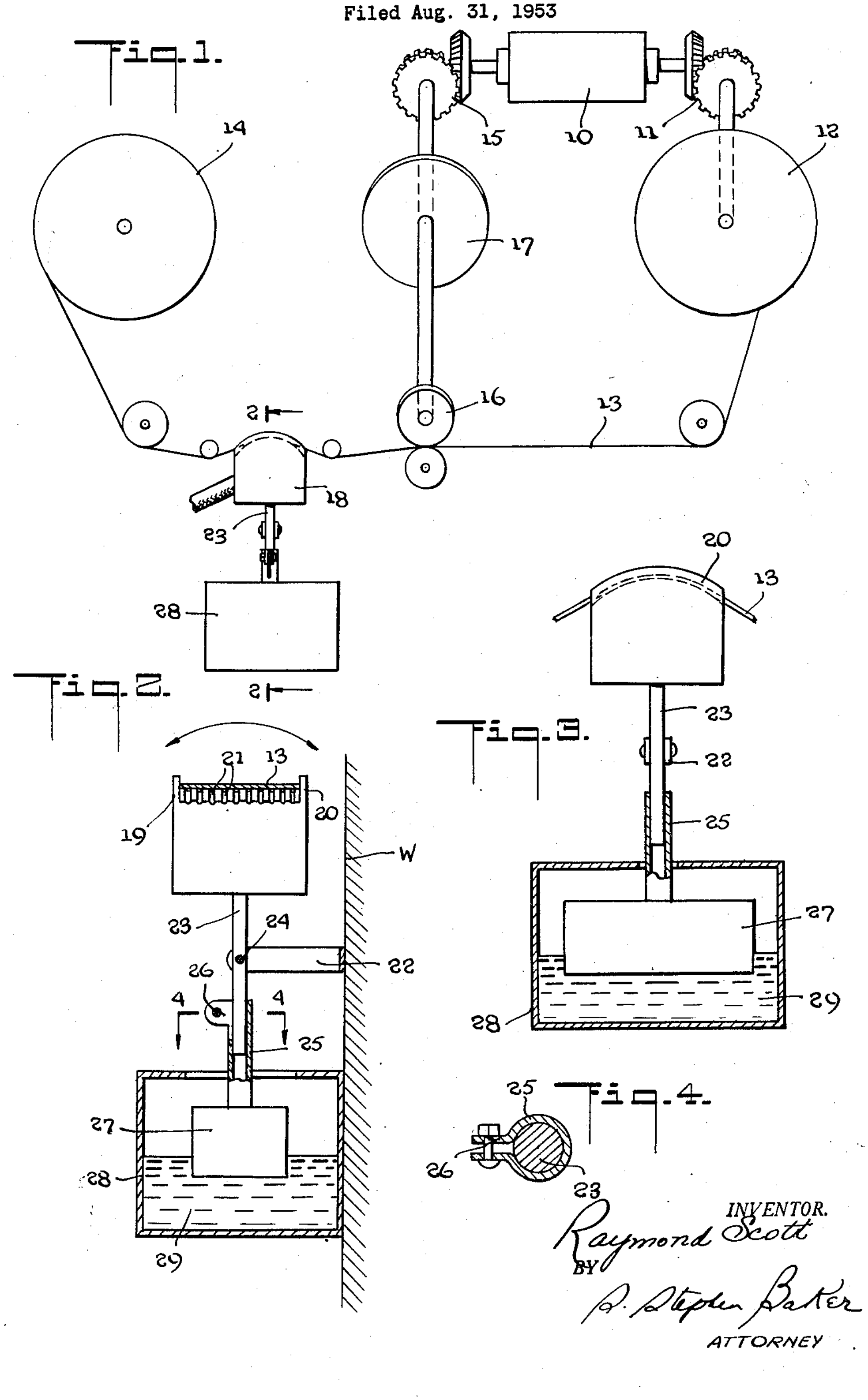
Figure 1 is a diagrammatic view of a tape recording mechanism equipped with the invention of the instant application.
Figure 2 is an enlarged cross-sectional view as taken along the line 2—2 of Figure 1.
Figure 3 is a view similar to Figure 2 but taken at 90° therefrom.
Figure 4 is a cross-sectional view as taken along the line 4—4 of Figure 2.

The recorder is largely conventional insofar as the reels and driving mechanism are concerned. Thus, a power source 10 drives gears 11 which drive the take-up reel 12.

The tape 13 is initially supplied in wound form on the load reel 14. Such tape may be of a width in the order of ½ to 3" or more. Gears 15 drive a capstan or the like 16 through a flywheel 17. Suitable guide rollers are employed as shown in Figure 1.

The recording head 18 comprises a housing wherein is contained the multi-channel circuit elements arranged in parallel rows. This housing is formed with side walls 19 and 20 which are arcuate at their upper ends and between which are formed a plurality of parallel gaps 21 over which the tape 13 lies. The arcuate upper ends of the side walls 19 and 20 extend higher than the gaps or tape thereon and thereby serve as guides for the running tape. However, notwithstanding the guide function of the side walls, the tape is found to shift laterally.

In Figure 1, the various elements of the recorder are illustrated as being secured to a vertical wall, the plane of the reels being parallel to that of the wall. This wall, designated by the letter W in Figure 2, may also serve to support the recording head for rocking action as will be described hereinafter. Thus, an arm 22 is secured to, and extending outwardly of wall W. Recording head 18 is provided with a downwardly depending shaft 23 which is connected by a pivot 24 to arm 22. If desired, pivot 24 may take the form of a universal joint such as a ball and socket.

Shaft 23 telescopes within a tube 25 in which it is adjustable through the ears 26. In order to produce the vertical adjustability, the ears may be loosened and the tube 25 slid upwardly or downwardly of shaft 23, whereupon the ears may be retightened. To the lower end of tube 25 is connected a counterbalance weight 27 which tends to maintain head 18 upright.

In accordance with the instant invention, I further employ the counterbalance 27 as a damping device. Thus, a tank 28 having liquid 29 receives the weight 27. This will obviously produce a damping action in that it will restrict the rocking motion of the head 18. It will further be recognized that the extent of such damping action will depend upon the degree of immersion of the weight in the liquid. This is adjusted in the manner described above, such action permitting the lowering or rising of the counterbalance weight 27 in liquid 29.

The invention will be understood from the foregoing description. Briefly, however, it may be pointed out that as the running tape 13 tends to waver or shift laterally, the pivot 24 automatically responds by causing the head to shift or follow accordingly in a direction perpendicular or transverse to the normal direction of tape travel and the head and tape thereby remain in proper contact. If the tape varies in thickness or other physical characteristics, it may also vary in its tendency to shift under these conditions and the counterbalance weight 27 may be adjusted vertically in order to regulate damping and consequent sensitivity.

The rocking head has another advantage in that it may be normally biased downwardly or counterclockwise from the position shown in Figure 2. This may be effected, for example, by making the left side of the weight 27 heavier than the right side as viewed in Figure 2. The purpose of thus biasing the head downwardly is to support tape against the side wall 19 even if the tape is not of a width to completely fill the space between the side walls 19 and 20. Thus, the side wall 19 will provide a reference support in the case of poorly cut or narrower tape.

What is claimed is:

1. In a magnetic tape recording apparatus, a recording-reproducing head having a planar top surface adapted to support magnetic tape travelling thereacross, and supporting means for said head, said supporting means comprising a shaft depending from said recording head, an arm adapted to be secured to a support, and a pivot connecting said shaft to said arm for permitting motion of said head in a direction transverse to the direction of travel of the tape, said head being mounted on one end of said shaft, and a counterweight mounted on the other end of said shaft and adapted to maintain said head in an upright position.

2. An apparatus according to claim 1 and including a damping tank having a supply of liquid therein, said weight being disposed within said tank for at least partial immersion in said liquid.

3. An apparatus according to claim 2 and including means to adjust said weight vertically in respect to said liquid so as to vary the degree of immersion in said liquid.

4. For use in a magnetic tape recording apparatus, a recording-reproducing head having a planar top surface adapted to support magnetic tape travelling thereacross, upstanding side walls on said head on both sides of said planar top surface and between which the tape is supported, and supporting means for said head, said supporting means comprising a downwardly depending shaft one end of which is connected to said head, a pivot medially disposed on said shaft so that said shaft may be swingably connected to a support, and a counterweight connected to the other end of said shaft.

5. A device according to claim 4 and including a damping tank in which said counterweight is disposed, and means to adjust said weight vertically in said tank whereby the degree of immersion of said weight in a quantity of fluid in said tank may be adjusted.

References Cited in the file of this patent

UNITED STATES PATENTS 1,638,999 Hornauer ---------------- Aug. 16, 1927

FOREIGN PATENTS 717,125 Germany ---------------- Feb. 6, 1942
858,206 France ---------------- May 6, 1940